US006198145B1

(12) United States Patent
Ferrari et al.

(10) Patent No.: US 6,198,145 B1
(45) Date of Patent: Mar. 6, 2001

(54) METHOD FOR MANUFACTURING A SEMICONDUCTOR MATERIAL INTEGRATED MICROACTUATOR, IN PARTICULAR FOR A HARD DISC MOBILE READ/WRITE HEAD, AND A MICROACTUATOR OBTAINED THEREBY

(75) Inventors: Paolo Ferrari, Gallarate; Benedetto Vigna, Potenza, both of (IT)

(73) Assignee: STMicroelectronics, S.r.l., Agrate Brianza (IT)

( * ) Notice: Subject to any disclaimer, the term of this patent is extended or adjusted under 35 U.S.C. 154(b) by 0 days.

(21) Appl. No.: 09/181,717

(22) Filed: Oct. 28, 1998

(30) Foreign Application Priority Data

Oct. 29, 1997 (EP) .................................................. 97830556

(51) Int. Cl.⁷ .......................... H01L 29/82; H01L 43/00; H02N 1/00; H01H 47/00
(52) U.S. Cl. .......................... 257/415; 257/420; 257/421; 257/426; 310/309; 361/207
(58) Field of Search ................................... 257/421, 422, 257/425, 426, 427, 415, 420; 310/309; 361/207; 430/310

(56) References Cited

U.S. PATENT DOCUMENTS

| | | | |
|---|---|---|---|
| 3,789,378 | 1/1974 | Bonzano et al. | 340/174.1 |
| 5,025,346 | * 6/1991 | Tang et al. | 361/283 |
| 5,151,763 | 9/1992 | Marek et al. | 357/26 |
| 5,216,631 | 6/1993 | Sliwa, Jr. | 365/174 |
| 5,233,213 | 8/1993 | Marek | 257/415 |
| 5,428,259 | 6/1995 | Suzuki | 310/309 |
| 5,438,469 | 8/1995 | Rudi | 360/109 |
| 5,477,097 | 12/1995 | Matsumoto | 310/309 |
| 5,521,778 | 5/1996 | Boutaghou et al. | 360/106 |
| 5,631,514 | 5/1997 | Garcia et al. | 310/309 |
| 5,657,188 | 8/1997 | Jurgenson et al. | 360/106 |

FOREIGN PATENT DOCUMENTS

| | | | |
|---|---|---|---|
| 0 482 205 A1 | 4/1992 | (EP) | . |
| 0 533 095 A2 | 3/1993 | (EP) | . |
| 0 578 228 A2 | 1/1994 | (EP) | ............................... H02N/1/00 |
| 0 578 228 A3 | 1/1994 | (EP) | ............................... H02N/1/00 |
| 0 613 124 A2 | 8/1994 | (EP) | . |
| 0 840 291 A2 | 5/1998 | (EP) | . |
| 2 296 297 | 7/1976 | (FR) | . |
| 7-177773 | 7/1995 | (JP) | . |
| WO 93/21536 | 10/1993 | (WO) | . |
| WO 95/34943 | 12/1995 | (WO) | . |

OTHER PUBLICATIONS

Horsley et al., "Angular micropositioner for disk drives", MEMS '97, Proceedings, IEEE Annual International Workshop, Jan. 26–30, 1997, pp. 454–459.*

Gianchandani et al., "Batch Fabrication and Assembly of Micromotor–Driven Mechanisms With Multi-Level Linkages," *Micro Electro Mechanical Systems,* IEEE, pp. 141–146, 1992.

(List continued on next page.)

*Primary Examiner*—Matthew Smith
*Assistant Examiner*—Lex H. Malsawma
(74) *Attorney, Agent, or Firm*—Theodore E. Galanthay; Robert Iannucci; Seed IP Law Group, PLLC

(57) ABSTRACT

The integrated microactuator has a stator and a rotor having a circular extension with radial arms which support electrodes extending in a substantially circumferential direction and interleaved with one another. For the manufacture, first a sacrificial region is formed on a silicon substrate; an epitaxial layer is then grown; the circuitry electronic components and the biasing conductive regions are formed; subsequently a portion of substrate beneath the sacrificial region is removed, forming an aperture extending through the entire substrate; the epitaxial layer is excavated to define and separate from one another the rotor and the stator, and finally the sacrificial region is removed to release the mobile structures from the remainder of the chip.

20 Claims, 6 Drawing Sheets

OTHER PUBLICATIONS

Lee et al., "Polysilicon Micro Vibromotors," *Micro Electro Mechanical Systems,* IEEE, pp. 177–182, Feb. 4–7, 1992.

Fujita et al., "Position Control Of An Electrostatic Linear Actuator Using Rolling Motion," *Mechatronics,* vol. 2, No. 5, pp. 495–502, Oct., 1992.

Fan et al., "Magnetic Recording Head Positioning at Very High Track Densities Using a Microactuator–Based, Two–Stage Servo System," *Transactions on Industrial Electronics,* IEEE, 42(3):222–233, Jun. 1995.

Moesner et al, "Electrostatic Devices For Particle Micro–Handling," IEEE, pp. 1302–1309, 1995.

Imamura et al., "Transverse Mode Electrostatic Microactuator For MEMS–Based HDD Slider," *IEEE,* pp. 216–221, 1996.

Horsley et al., "Angular Micropositioner For Disk Drives," *IEEE MEMS '97 Workshop* Nagoya, Japan.

Pannu et al., "Accelerometer Feedforward Servo For Disk Drives." Presented at the *Advanced Intelligent Mechatronics–International Conference,* Tokyo, Japan, Jun. 1997.

Aggarwal, "Design and Control of Micro–Actuators For High Density Disk Drives", *Thesis—Graduate Division—University of California at Berkeley,* May 1997.

Aggarwal et al., "Micro–Actuators For High Density Disk Drives," *American Control Conference,* Jun. 4–6, 1997.

Peter Mee et al, "Only Clean Drives Are Good Drives," *Data Storage,* pp. 77–80, Sep., 1997.

Tang et al., "Laterally Driven Polysilicon Resonant Microstructures", *Sensors and Actuators* 20(½):25–32, 1989.

Starr, "Squeeze–Film Damping in Solid–State Accelerometers," *IEEE Solid–State Sensor and Actuator Workshop,* pp. 44–47, Jun. 1990.

Zhang et al., "Viscous Air Damping in Laterally Driven Microresonators," *IEEE Workshop* No. 7, pp. 199–204, Jan. 25, 1994.

Veijola et al., "Model for Gas Film Damping in a Silicon Accelerometer," *1997 International Conference on Solid–State Sensors and Actuators,* pp. 1097–1100, Jun. 16–19, 1997.

* cited by examiner

METHOD FOR MANUFACTURING A SEMICONDUCTOR MATERIAL INTEGRATED MICROACTUATOR, IN PARTICULAR FOR A HARD DISC MOBILE READ/WRITE HEAD, AND A MICROACTUATOR OBTAINED THEREBY

TECHNICAL FIELD

The present invention relates to a method for manufacturing a semiconductor material integrated microactuator, in particular for a hard disc mobile read/write head, and the microactuator obtained thereby.

BACKGROUND OF THE INVENTION

In hard disc read/write devices of a known type, the read/write heads are glued directly to the end of a steel suspension unit, which allows the head to be moved at a predetermined distance from the disc, currently approximately 30 nm.

To obtain more accurate and finer head position control, it has been proposed to arrange a microactuator between the head and the steel suspension unit. This microactuator must impart to the head (which generally has a weight of a few milligrams) an acceleration that is 20–30 times that of gravity; this means that the microactuator should be able to exert a force of approximately tenths of milliNewtons to be suitable for this purpose.

The microactuator must also be very flexible in a plane parallel to the disc, as well as being highly resistant in a perpendicular direction, to support the weight of the head (currently 1.5 mg), and to oppose the pressure generated during operation. In fact, as the disc rotates, a pressure profile is generated on the surface of the latter which tends to move the head away from the disc. On the other hand, if the head is moved away from the disc further than predetermined limits, the signal is so attenuated to make it impossible to read/write data; as a result, to maintain the required position, the suspension unit must currently exert on the head a direct force of approximately 2–3 g towards the disc.

The integrated microactuators available to date use actuation forces of electromagnetic and electrostatic nature.

Microactuators using electromagnetic forces are disadvantageous, because they require depositing of magnetic materials that are not commonly used in the microelectronics industry. Because the data on the disc is stored by magnetizing the disc surface, interference effects are possible between the data recording on the disc and the actuation mechanism. Furthermore, structures that use magnetic forces are more difficult to scale than those that use electrostatic forces.

Microactuators which use electrostatic type forces are preferable, both as regards the possibility of manufacturing the microactuators using conventional microelectronics production techniques, and because of the compatibility with the processes of reading and writing data on the disc.

Various solutions have been proposed for producing microactuators of an electrostatic type; according to a first solution, the elements of the actuator are produced by surface micromachining, i.e., by using surface layers deposited on a wafer of semiconductor material, or by electrogalvanic growth, or through ad hoc processes that differ from those normally used in microelectronics.

The technique of surface micromachining has the disadvantage that it does not allow manufacturing of structures having the above-described requirements, because the thinness of the polysilicon films which can be produced by common deposition techniques make the final structures not sufficiently rigid in a direction perpendicular to the disc; in addition, they cannot impart sufficient accelerating electrostatic force to the head, and are unstable because the edge effects are higher than the surface effects, and the system is less linear.

The system using galvanic growth, in which layers of metallic material are used, has the disadvantage that it has worse mechanical characteristics (in particular with reference to the yield strength $\sigma$, and is subject to hysteresis (whereas silicon does not have hysteresis); on the other hand the solution which uses ad hoc processes is difficult to industrialize, and has low yields.

SUMMARY OF THE INVENTION

One object of the present invention is to provide a method and a microactuator which are free from the disadvantages of the solutions available to date.

According to the present invention, a method is provided for manufacturing a semiconductor material integrated microactuator, in particular for a hard disc mobile read/write head, and the microactuator obtained thereby.

BRIEF DESCRIPTION OF THE DRAWINGS

For a better understanding of the present invention, a preferred embodiment is now described, purely by way of non-limiting example, with reference to the attached drawings, in which.

DETAILED DESCRIPTION OF THE INVENTION

Figure 1:
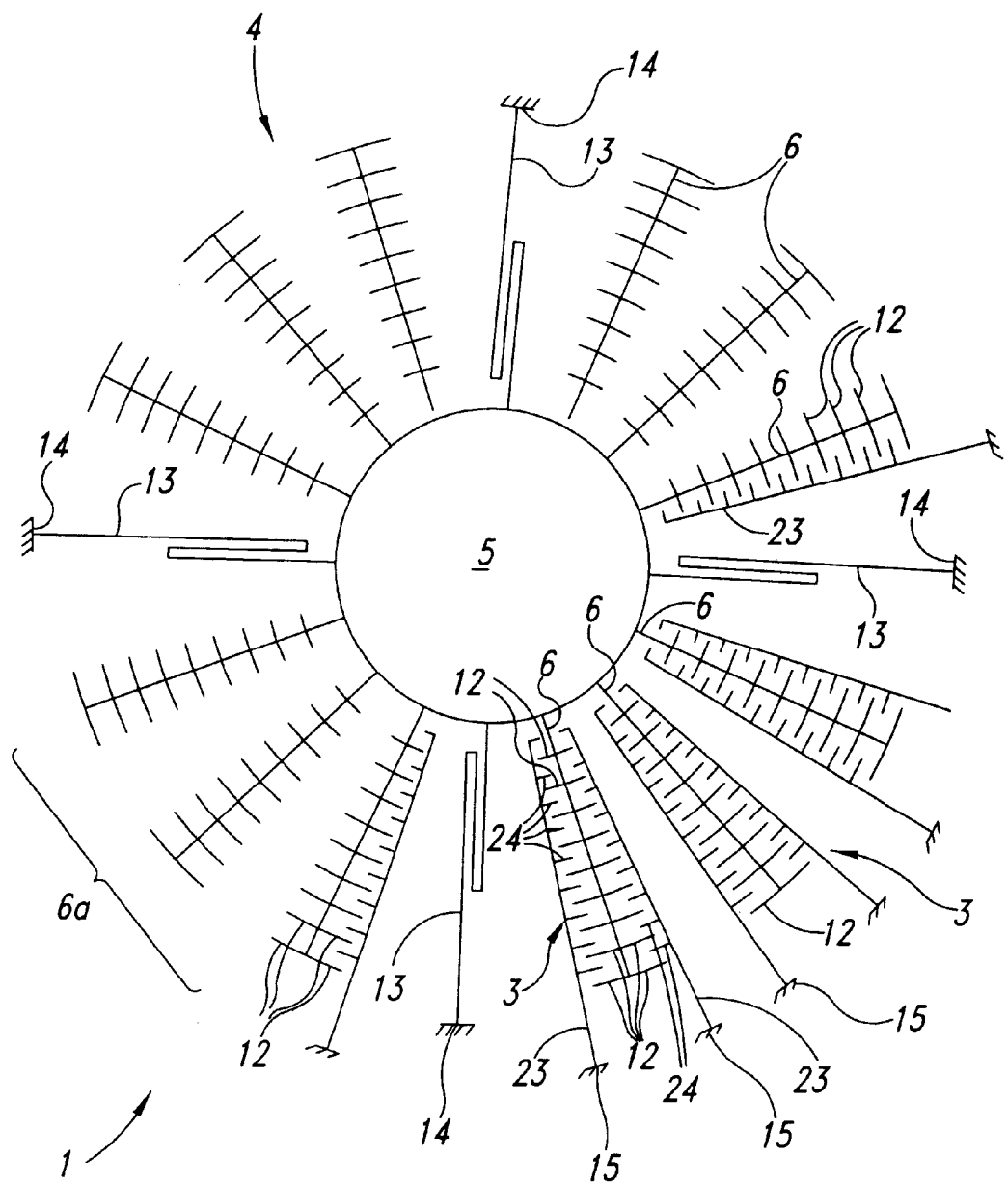
FIG. 1 is a schematic, plan view of the microactuator according to one embodiment of the invention.

With reference to FIG. 1, the microactuator I comprises a stator 3, configured to be rigidly connected to a steel suspension unit (not shown), and a rotor 4, configured to be connected to a read/write head (not shown), and coupled in a capacitive manner to the stator 3.

The rotor 4 comprises a suspended mass 5 which has a substantially circular shape and a plurality of mobile arms 6 projecting radially outward from the suspended mass 5. In the illustrated embodiment, the mobile arms 6 form four identical arm groups 6a each arm group 6a oriented in a quadrant, and each arm group 6a having three mobile arms 6, equidistant from one another. Each arm 6 supports a plurality of elongated protrusions defining mobile electrodes 12 projecting on both sides from the mobile arm 6 in a substantially circumferential direction (i.e., perpendicularly to the corresponding mobile arm 6), and substantially equidistantly from one another.

The rotor 4 also includes a plurality of resilient suspension and anchorage elements, hereinafter calls simply "springs" 13, which are disposed between adjacent arm groups 6a, and which resiliently connect the suspended mass 5 to fixed anchorage regions 14, biasing the rotor 4 and the mobile electrodes 12. In the illustrated embodiment, in plan view, each spring 13 is substantially S-shaped and has a constant width of 1–10 μm.

The stator 3 (whereof only part is shown in full, owing to the symmetry of the structure) comprises a plurality of radially aligned fixed arms 23, each of which supports a plurality of elongated protrusions extending in a substantially circumferential direction (i.e., perpendicularly to the corresponding fixed arm 23), and defining fixed electrodes 24. For example, two fixed arms 23 are positioned between two mobile arms 6, and the fixed electrodes 24 project from each fixed arm 23 only to the side thereof facing the mobile arm 6 and are intercalated or interleaved with the mobile electrodes 12. The fixed arms 23 project from fixed regions 15 which are disposed annularly around the rotor 4, and are intercalated with the anchorage regions 14.

Figure 2:
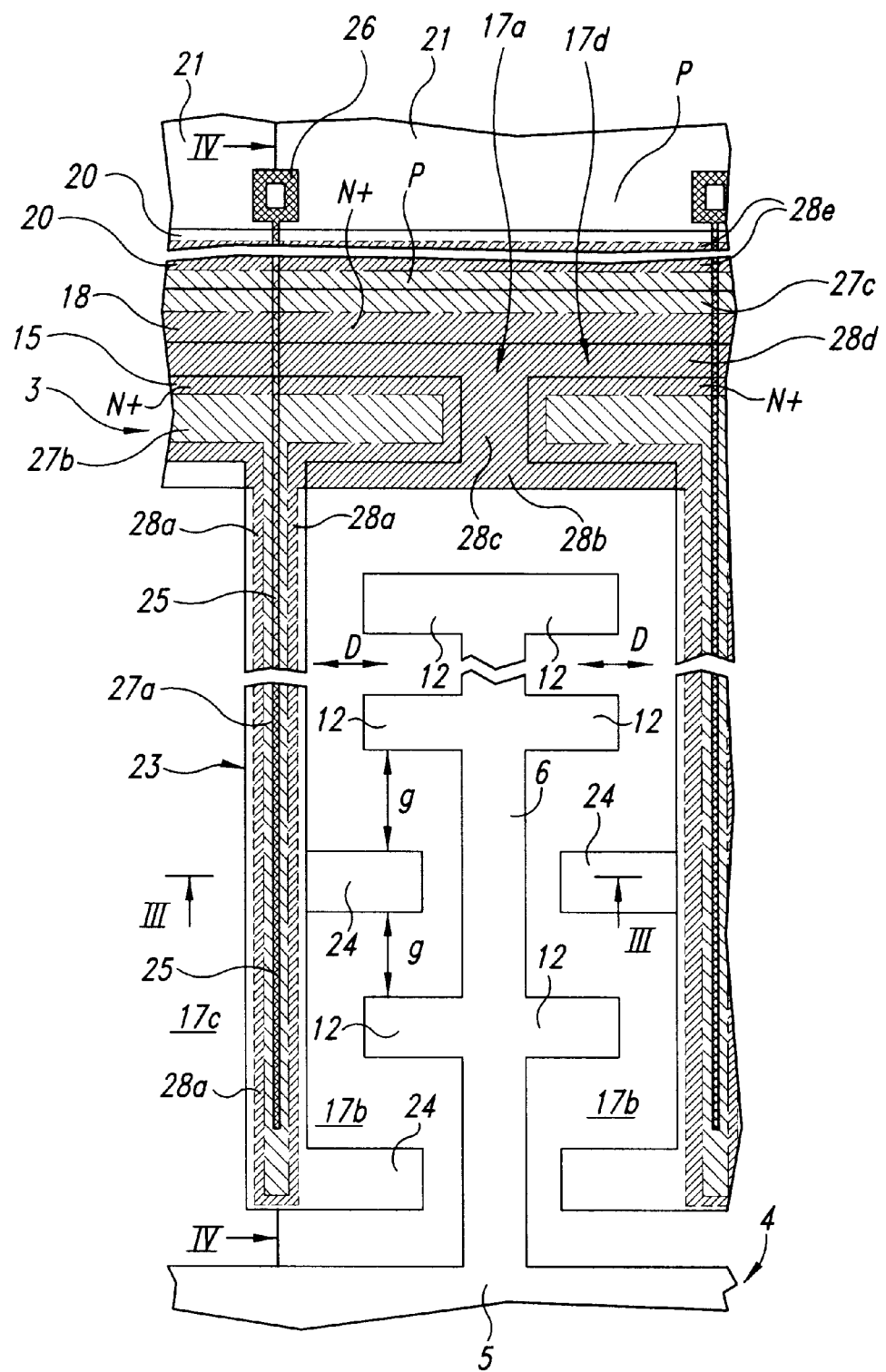
FIG. 2 is an enlarged plan view of a portion of the microactuator of FIG. 1, on an enlarged scale.
Figure 3:
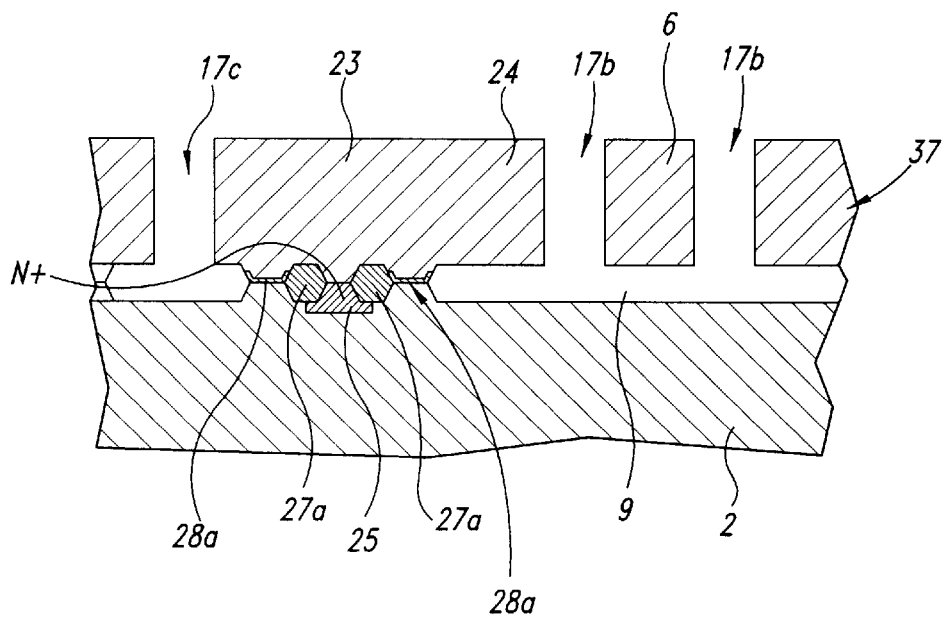
FIGS. 3 and 4 are transverse cross-sections of details of the microactuator of FIG. 1, taken along section lines III—III and IV—IV, respectively, as defined in FIG. 2.

In the microactuator in FIG. 1, the fixed electrodes 24 and mobile electrodes 12, which are interleaved with one another, form a plurality of capacitors. When voltage drops $\Delta V_1$, $\Delta V_2$, are applied between two adjacent fixed arms 23 that are facing the same mobile arm 6, the mobile arm 6 due to capacitive coupling, is subjected to a transverse force that tends to move it away from the arm 23 set at the nearer potential, and to bring it closer to the other arm 23 at a greater $\Delta V$. This causes rotation of the suspended mass 5 and resilient deformation of the springs 13. The extent of the force F acting on the rotor 4 is equal to:

$$F = a\_\Gamma_0\_N\_t\_\Delta V^2/g$$

wherein a is a shape factor depending on the system geometry, $\epsilon_0$ is the electrical permeability of the air, N is the number of interleaved electrodes 12, 24; t is the thickness of the structure measured perpendicularly to the sheet, and g is the gap between each mobile electrode 12 and the two facing fixed electrodes 24 (see FIG. 2 in which the arrows D represent the direction of movement of the mobile arms 6 and the corresponding mobile electrodes 12).

Therefore, owing to actuation in a direction parallel to the electrodes, a very stable structure is obtained, because the force is independent of the overlapping between the mobile and the fixed teeth (in the case of actuation in a perpendicular direction, with variation of the active gap between the electrodes, the force depends on the inverse of the square of the active distance g, and a force which is so greatly non-linear causes the presence of a limit voltage beyond which the resilient reaction is no longer sufficient to keep the stator separate from the rotor). In addition, use of a circular structure with rotatory, non-linear movement, makes it possible to obtain a system which is less sensitive to the acceleration transmitted by the suspension unit during operation, for example during the search for the track.

An exemplary embodiment of the present actuator is illustrated in FIGS. 2–5. The rotor 4 comprises $N^+$-doped polycrystalline silicon obtained from an epitaxial layer 37 (described in detail below) above an aperture 7 (FIGS. 4 and 5) provided in a substrate 2 of the device. An air gap 9 (FIG. 5) is provided between the substrate 2 and the epitaxial layer 37 and comprises an annular region 9a and a plurality of star-like arms 9b. In particular, the annular region 9a extends without interruption from the aperture 7, radially towards the exterior of the aperture 7, and the star-like arms 9b extend below the mobile arms 6, the corresponding mobile electrodes 12 and the fixed electrodes 24 which face the latter, in radial direction. As an alternative to the embodiment shown, the air gap 9 can have a completely annular shape extending not only below the mobile arms 6, the mobile electrodes 12, and the fixed electrodes 24, but also below the fixed arms 23, at the interface between the substrate 2 and the epitaxial layer 37.

The anchorage regions 14 (FIG. 5) and the fixed regions 15 are also formed in the epitaxial layer 37, and are disposed annularly around the suspended mass 5. The fixed regions 15 are separated from one another and from the anchorage regions 14 by radial portions 17a of a trench 17 that also has zig-zag portions 17b, and wedge-shaped portions 17c The zig-zag portions 17b extend generally in a radial direction and separate from one another the mobile arms 6, the fixed arms 23, the mobile electrodes 12 and the fixed electrodes 24 The wedge-shaped portions 17c extend between the two fixed arm 13 which are adjacent to one another and face different mobile arms 6.

The anchorage regions 14 and the fixed regions 15 are surrounded by a bulk region 18 that has an annular shape of N-type, also formed in the epitaxial layer 37, and separated from the regions 14 and 15 by a circular portion 17d of the trench 17. As can be seen in particular in the detail of FIG. 2 and in the sections in FIGS. 3 and 4, the bulk region 18 is surrounded by a polycrystalline epitaxial region 20 of P-type, which in turn is surrounded by a monocrystalline region 21 embedding the external circuitry of the microactuator 1.

Figure 4:
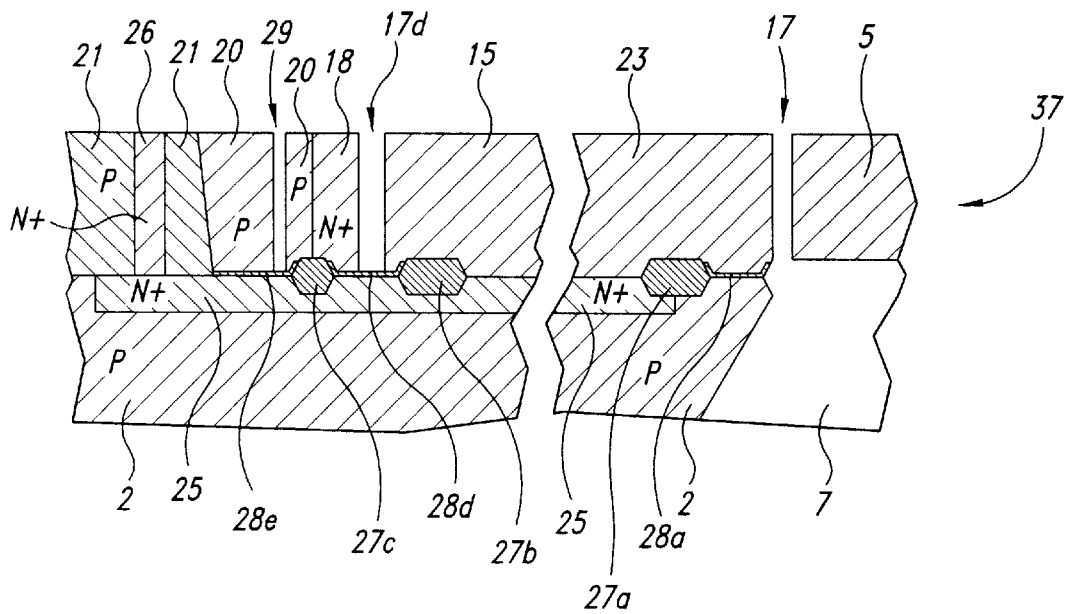
Figure 5:
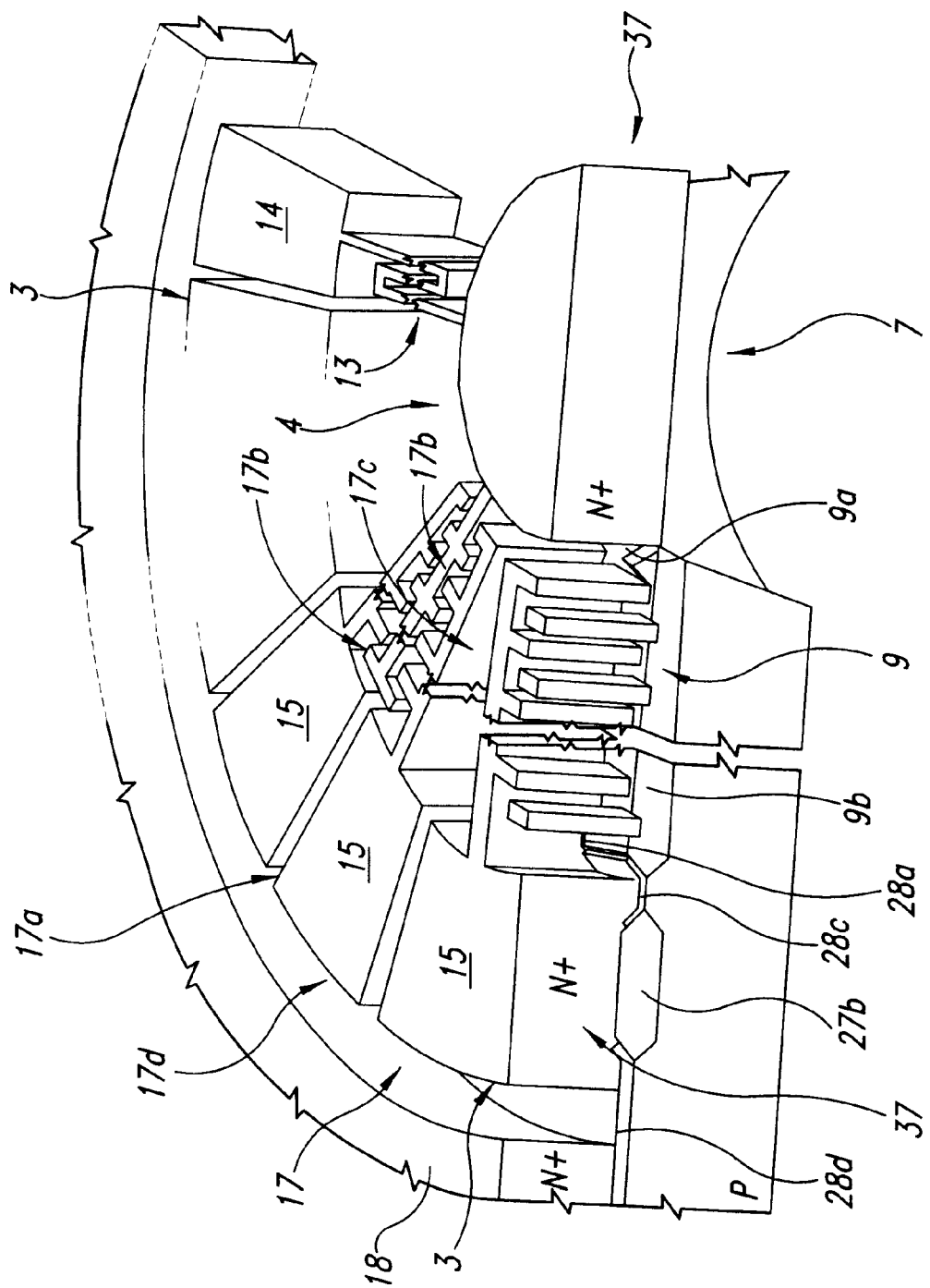
FIG. 5 is a cross-sectional and perspective view of the microactuator of FIG. 1.

A buried contact region 25 of $N^+$-type extends below each fixed arm 23 and the corresponding fixed region 15, inside the substrate 2 and near its surface 22 (FIG. 6) interface with the epitaxial layer 37 The buried contact region 25 continues below the bulk region 18, the polycrystalline epitaxial region 20, and part of the monocrystalline region 21, where it is in electrical contact with a sinker region 26 extending from a surface 30 (FIG. 11) of the epitaxial layer 37. At the fixed arms 23, the buried contact regions 25 are surrounded by buried oxide regions 27a (see in particular FIGS. 2 and 3), which, at the fixed region 15, become wider and have a generally T-shape with a head 27b. Each buried oxide region 27a is in turn surrounded by a U-shaped section 28a of a silicon nitride insulation region 28f, which, at the fixed regions 15 and the anchorage regions 14, widens to define circumferential sections 28b that connect pairs of adjacent U-shaped sections 28a The circumferential sections 28b are continued by radial sections 28c which extend below the radial portions 17a of the trench 17 In turn, the radial sections 28c are connected to a circular section 28d, which extends partially beneath the fixed regions 15 and the anchorage regions 14, beneath the circular portion 17d of the trench 17, and beneath part of the bulk region 18. A buried oxide region 27c (which can be seen in FIGS. 2 and 4) extends below the interface between the bulk region 18 and the polycrystalline epitaxial region 20, is surrounded by a nitride region 28e extending along the interface surface 22 and insulates the buried contact region 25 from the epitaxial layer. The nitride region 28e extends near the outer edge of the polycrystalline epitaxial region 20, as can be seen in FIG. 2. In addition, as can be seen in FIG. 4, a trench 29 with a closed rectangular shape, extending inside the polycrystalline epitaxial region 20 from the surface 30 as far as the nitride region 28e, separates the microactuator I electrically from the remainder of the device.

The method for production of the microactuator 1 is described hereinafter with reference to FIGS. 6–13, in which the thicknesses of the various layers of material are not to scale, and some layers are not shown in all the figures, for sake of representation.

Figure 6:
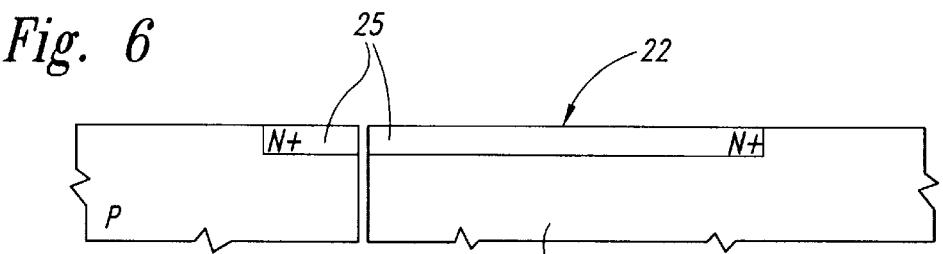
FIGS. 6–13 are transverse cross-sectional views through a semiconductor material wafer illustrating successive steps of the present production method.
Figure 7:
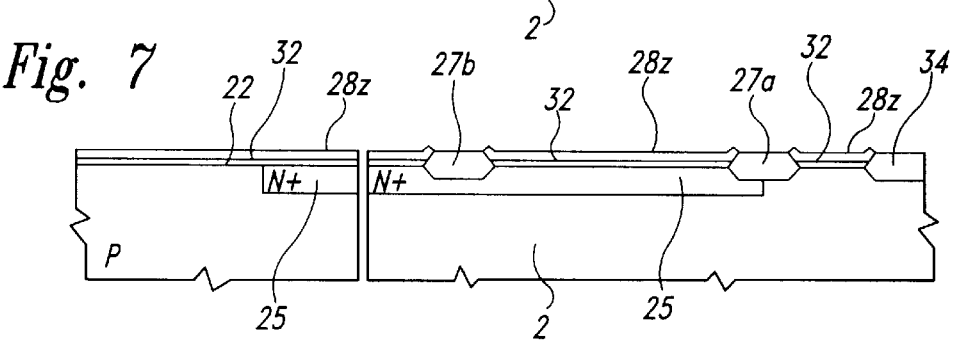
Figure 8:
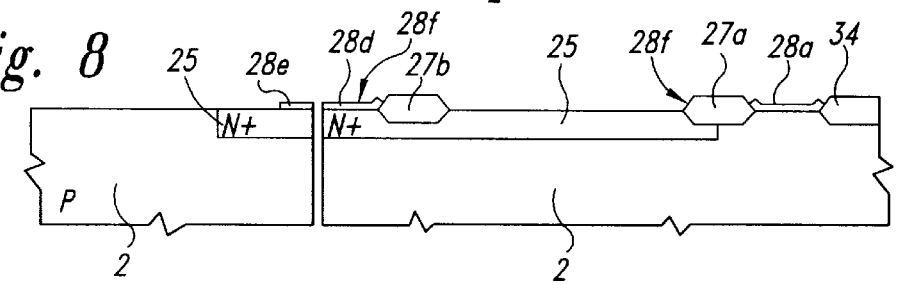

As shown in FIG. 6, in the monocrystalline silicon substrate 2, the buried contact regions 25 of N⁺-type are formed by conventional masking and implantation techniques. On the interface surface 22 of the substrate 2 a pad oxide layer 32 is then formed, as shown in FIG. 7. The pad oxide layer 32 can be, for example, thermally grown. Above the pad oxide layer 32, a silicon nitride layer 28 is deposited. The silicon nitride layer 28 is then defined and removed selectively in order to obtain protective regions 28z. Subsequently, the portions of the surface of the substrate 2 which are not covered by the protective regions 28z are locally oxidized and form oxide regions including a sacrificial region 34, and the buried oxide regions 27a, 27b, 27c (of which only the first two can be seen in FIG. 7), thus providing the structure of FIG. 7.

Subsequently, by means of masking steps, the portions of the layers 32, 28 are removed where the contacts are to be formed for the fixed regions 15, the fixed arms 23, and the bulk region 18. The portions of the silicon nitride layer 28 are then removed in the circuitry area, thus providing the structure of FIG. 8, in which the pad oxide layer 32 that is below the silicon nitride layer 28 is not shown, and in which the sections 28a and 28d of the nitride region 28f, and part of the nitride region 28e can be seen.

Figure 9:
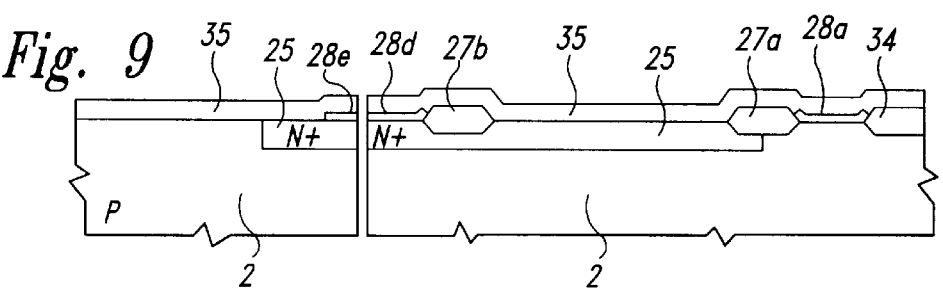

Next, a polycrystalline or amorphous silicon layer 35 is deposited, as shown in FIG. 9. Through phototechnical and plasma etching steps, the polycrystalline or amorphous silicon layer 35 is removed from the exterior of the actuator area 36, forming a silicon region 35' which constitutes the seed for the subsequent epitaxial growth.

Figure 10:
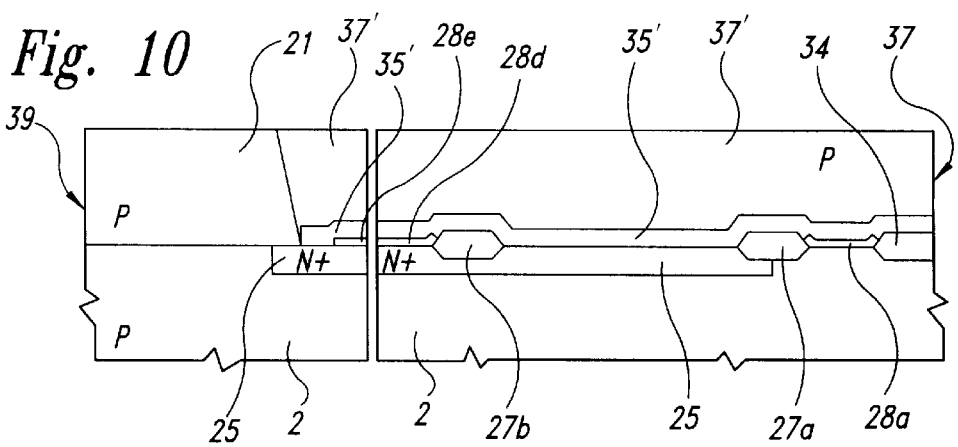
Figure 13:
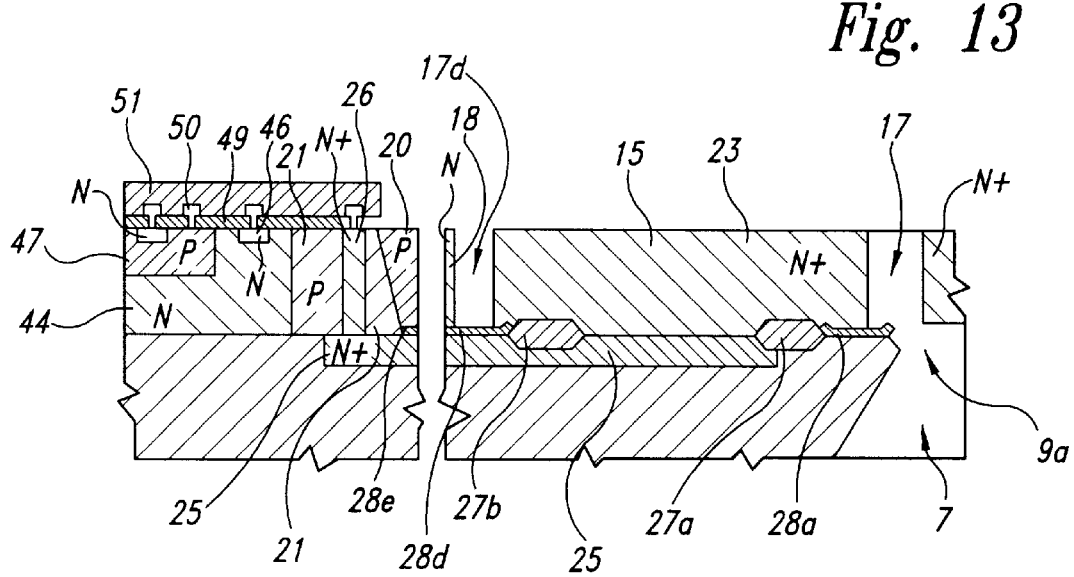

Subsequently, by etching, the pad oxide layer 32 is removed where it is exposed, and epitaxial growth is carried out with formation of the pseudo-epitaxial layer 37 of P-type which, above the silicon region 35', has a polycrystalline structure (polycrystalline region 37') and elsewhere has a monocrystalline structure (which constitutes the monocrystalline region 21 of FIG. 13). A wafer 39 is thus obtained, as shown in FIG. 10.

Figure 11:
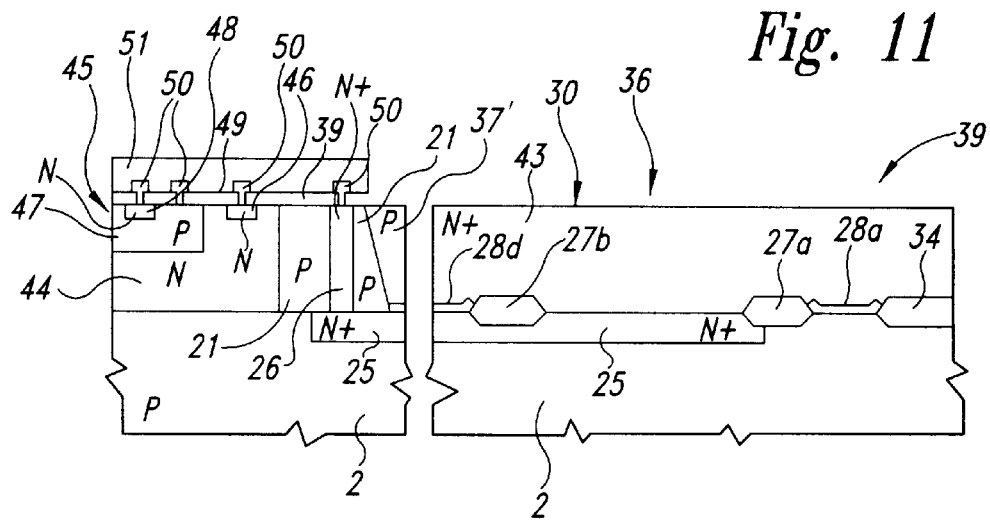

Next, the pseudo-epitaxial layer 37 is doped with doping ions which give rise to N-type conductivity to form sinker regions. In particular, as shown in FIG. 11, in the monocrystalline region 21, the sinker region 26 of N⁺-type is formed and extends from the surface 30 of the wafer 39 as far as the buried contact region 25. In addition, in the polycrystalline region 37' a well 43 of N⁺-type is formed, which is designed to define the suspended mass 5, the mobile and fixed arms 6, 23, the mobile and fixed electrodes 12, 24, the fixed regions 15, the anchorage regions 14 and the bulk region 18, and which also extends from the surface 30 as far as the substrate 2, contacting electrically the buried contact region 25.

Subsequently, by means of standard steps, the electronic components of the circuitry are formed. In the illustrated example, a collector well 44 of N-type is formed, which extends in the interior of the monocrystalline region 21, from the surface 30 of the wafer 39 as far as the substrate 2; in the collector well 44 an NPN transistor 45 is formed which has a collector contact region 46 of N-type, a base region 47 of P-type and an emitter region 48 of N⁺-type.

On the surface 30 of the wafer 39, a dielectric layer 49 is then deposited for contact opening and comprise, for example, BPSG (Boron Phosphorous Silicon Glass). Then, by a masking and selective removing step, contacts are opened in the circuitry area and on the sinker region 26, and the dielectric layer 49 is removed in the actuator area 36 Subsequently, a metallic layer is deposited and shaped, to form circuitry contacts 50 and the sinker regions 26.

A passivation dielectrode layer 51 is then deposited and removed from the area of the contact pads (to allow electrical contacting of the device, in a manner not shown) and in the microactuator area 36, thus providing the structure of FIG. 11.

Figure 12:
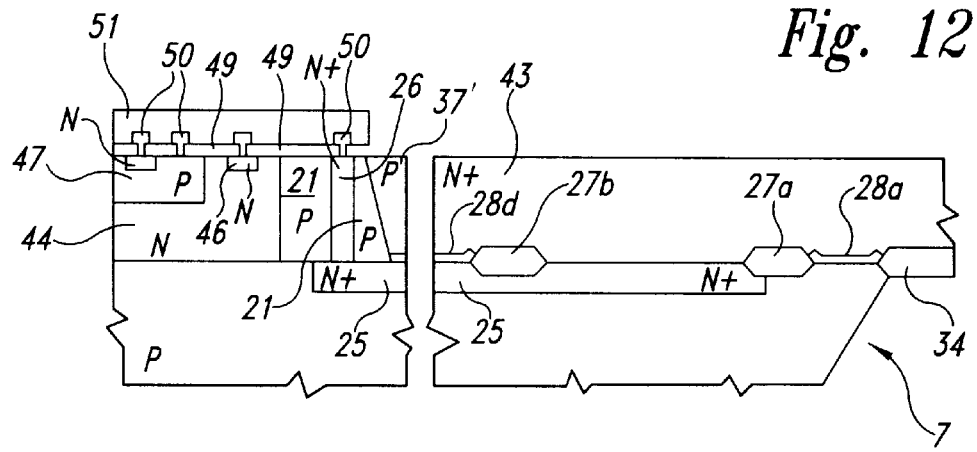

Subsequently, by means of a photolithographic step, areas are defined on the wafer back and TMAH (tetramethylammoniumhydrate) etching is carried out on the back of the wafer 39, to remove the portion of the substrate 2 which is beneath the sacrificial region 34. The etching stops automatically on the sacrificial region 34, providing the aperture 7 as shown in FIG. 12.

Subsequently, using an appropriate resist or deposited oxide mask, the trench 17 is excavated for shaping the suspended mass 5, the mobile and fixed arms 6, 23, and the mobile and fixed electrodes 12, 24, and for separating the biased regions at different voltages. In addition, the trench 29 (FIG. 4) is excavated.

Finally, the sacrificial region 34 is removed by buffered hydrofluoric acid etching, such as to provide the air gap 9. This releases in the mobile arms and the mobile and fixed electrodes 12, 24. Then the final structure shown in FIG. 13 is obtained.

The advantages of the described microactuator and production method are as follows. Being formed from the epitaxial layer, the microactuator has the high quality mechanical features required. By using electrostatic type actuation forces and owing to the described circular structure, there is a significantly reduced risk of interference with the read/write processes on the magnetic disc, and the actuator is substantially insensitive to stresses. In addition, the specific shape of the electrodes reduces the risk, which exists in other types of shapes, of stiction of the rotor on the stator in the presence of high biasing. The use of manufacturing techniques conventional for integrated electronics makes the structure cheap and repeatable, and allows integration on the chip of the associated circuitry.

Finally, it will be apparent that changes and variants can be made to the method described and illustrated here, without departing from the scope of the present invention, as defined in the attached claims.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A semiconductor material integrated microactuator comprising a stator element and a rotor element electrostatically coupled to the stator element by respective fixed and mobile electrodes, the microactuator being supported by a substrate of semiconductor material, the stator and rotor elements being configured from respective portions of an epitaxial layer of semiconductor material having trenches separating the rotor element from the stator element and electrically insulating the rotor and stator elements from conductive regions of the microactuator.

2. The microactuator according to claim 1, wherein the rotor element further comprises a centrally suspended mass, at least one mobile arm projecting radially from the suspended mass, and a plurality of first extensions projecting transversely from the mobile arm, and wherein the stator element further comprises at least one fixed region formed in the epitaxial layer, at least one fixed arm projecting radially from the fixed region toward the suspended mass, and a plurality of second extensions projecting transversely from the fixed arm, the second extensions being interleaved with respect to the first extensions, and the fixed region being supported by the substrate and being electrically insulated from the substrate by an insulating material.

3. The microactuator according to claim 2, wherein the mobile arm is positioned between two fixed arms and the two fixed arms are configured to be biased to a different potential.

4. The microactuator according to claim 2, further comprising an anchorage region supported by the substrate and a resilient, suspended arm extending between the suspended mass and the anchorage region to resiliently support the suspended mass, the anchorage region being positioned adjacent to, but electrically insulated from, the fixed region.

5. The microactuator according to claim 4, wherein the substrate has a first conductivity type, and wherein the epitaxial layer has a polycrystalline region and a monocrystalline region adjacent the polycrystalline region, the polycrystalline region having a second conductivity type, the polycrystalline region encompassing the stator and rotor elements, and, the monocrystalline region having the first conductivity type, and further comprising a plurality of sinker contact regions of the second conductivity type extending in the monocrystalline region between an upper surface and the substrate, and further comprising a plurality of first buried contact regions extending in the substrate between the fixed region and the anchorage region, and a plurality of second buried contact regions extending in the substrate between the fixed region and the sinker contact regions.

6. The microactuator according to claim 5, wherein the plurality of buried contact regions includes a first buried contact region having a biasing section extending below and in electrical contact with the fixed arm, the biasing section being surrounded on at least two sides by electrically insulating regions.

7. The microactuator according to claim 5, further comprising electronic components positioned in the monocrystalline region.

8. The microactuator according to claim 2, wherein the substrate has a through aperture below the suspended mass; and wherein an air gap extends between the substrate and the epitaxial layer, at least below the mobile arms and the second extensions.

9. The microactuator according to claim 1, wherein the substrate has an aperture below the rotor element.

10. An integrated microactuator comprising:
    an insulative substrate;
    a conductive epitaxial layer bonded to the substrate;
    a stator element configured from a first portion of the epitaxial layer, the first portion of the epitaxial layer being rigidly connected to a first portion of the substrate, a first region of the stator being formed into at least one fixed electrode; and
    a rotor element configured from a second portion of the epitaxial layer, the second portion of the epitaxial layer being resiliently coupled to a second portion of the substrate, the second portion of the substrate being separated from the first portion of the substrate to conductively insulate the stator element from the rotor element, a first end of the rotor element being formed into at least one mobile electrode, the mobile electrode on the rotor element being electrostatically coupled with the fixed electrode on the stator element.

11. The microactuator of claim 10, wherein the rotor element further comprises:
    at least one anchorage region fixedly attached to the second portion of the substrate;
    a suspended mass configured from a central portion of the epitaxial layer, wherein the suspended mass is physically separated from the substrate;
    a resilient suspension element extending from the anchorage region to the suspended mass to allow the suspended mass to rotate with respect to the substrate;
    a mobile arm projecting radially outward from the suspended mass; and
    a plurality of first transverse extensions projecting from the mobile arm.

12. The microactuator of claim 11 wherein the stator element further comprises:
    a fixed region formed in the first portion of the epitaxial layer, the fixed region being supported by the substrate and being electrically insulated from the substrate by an insulating material;
    a fixed arm projecting radially inward from the fixed region toward the suspended mass; and
    a plurality of second transverse extensions projecting from the fixed arm, the second transverse extensions being interleaved with respect to the first extensions.

13. The microactuator according to claim 11, wherein the mobile arm is positioned between two fixed arms and the two fixed arms are configured to be biased to a different potential.

14. The microactuator according to claim 12, wherein the substrate has a through aperture below the suspended mass, and an air gap extends between the substrate and the epitaxial layer, at least below the mobile arms and the second transverse extensions.

15. The microactuator according to claim 10, wherein the substrate has an aperture below the rotor element.

16. A semiconductor material integrated microactuator, comprising:
    a semiconductor substrate of first conductivity type;
    a stator element formed in a semiconductor epitaxial layer supported by the substrate, the stator element including fixed electrodes; and
    a rotor element formed in the epitaxial layer and including mobile electrodes electrostatically coupled to the fixed electrodes, the rotor element being separated from the stator element by trenches that electrically insulate the rotor and stator elements from conductive regions of the microactuator, wherein the substrate has a first conductivity type, and wherein the epitaxial layer has a polycrystalline region and a monocrystalline region adjacent to the polycrystalline region, the polycrystalline region having a second conductivity type, the polycrystalline region encompassing the stator and rotor elements, and the monocrystalline region having the first conductivity type, and further comprising a plurality of sinker contact regions of the second conductivity type extending in the monocrystalline region between an upper surface and the substrate, and further comprising a plurality of buried contact regions coupled to the sinker contact regions.

17. The microactuator according to claim 16, wherein the rotor element further comprises a centrally suspended mass, a mobile arm projecting radially from the suspended mass, and wherein the stator element further comprises a fixed region formed in the epitaxial layer, at least one fixed arm projecting radially from the fixed region toward the suspended mass, and the fixed region being supported by the substrate and being electrically insulated from the substrate by an insulating material.

18. The microactuator according to claim 17, further comprising an anchorage region supported by the substrate and a resilient, suspended arm extending between the suspended mass and the anchorage region to resiliently support the suspended mass, the anchorage region being positioned adjacent to, but electrically insulated from, the fixed region.

19. The microactuator according to claim 17 wherein the substrate has a through aperture below the suspended mass; and wherein an air gap extends between the substrate and the epitaxial layer, at least below the mobile arm.

20. The microactuator according to claim 17, wherein the plurality of buried contact regions includes a first buried contact region having a biasing section extending below and in electrical contact with the fixed arm, the biasing section being surrounded on at least two sides by electrically insulating regions.

* * * * *

UNITED STATES PATENT AND TRADEMARK OFFICE
CERTIFICATE OF CORRECTION

PATENT NO. : 6,198,145 B1  
DATED : March 6, 2001  
INVENTOR(S) : Paolo Ferrari et al.

Page 1 of 1

It is certified that error appears in the above-identified patent and that said Letters Patent is hereby corrected as shown below:

<u>Title page,</u>
Item [30], the Foreign Priority Application number should read -- 97830556.3 --.

Signed and Sealed this

Eighteenth Day of December, 2001

Attest:

Attesting Officer

JAMES E. ROGAN
*Director of the United States Patent and Trademark Office*